(12) United States Patent
Wang et al.

(10) Patent No.: US 7,577,540 B2
(45) Date of Patent: Aug. 18, 2009

(54) RE-CONFIGURABLE EMBEDDED CORE TEST PROTOCOL FOR SYSTEM-ON-CHIPS (SOC) AND CIRCUIT BOARDS

(75) Inventors: Seongmoon Wang, Plainsboro, NJ (US); Srimat T. Chakradhar, Manalapan, NJ (US); Kedarnath J. Balakrishnan, Princeton, NJ (US)

(73) Assignee: NEC Corporation, Tokyo (JP)

( * ) Notice: Subject to any disclaimer, the term of this patent is extended or adjusted under 35 U.S.C. 154(b) by 1573 days.

(21) Appl. No.: 10/108,476

(22) Filed: Mar. 29, 2002

(65) Prior Publication Data

US 2003/0167144 A1 Sep. 4, 2003

Related U.S. Application Data

(60) Provisional application No. 60/361,057, filed on Mar. 1, 2002.

(51) Int. Cl.
*G01R 31/317* (2006.01)
*G06F 11/26* (2006.01)

(52) U.S. Cl. ............... 702/119; 702/117; 702/118; 702/120; 714/742

(58) Field of Classification Search ......... 702/119, 702/118, 121, 120, 122, 117
See application file for complete search history.

(56) References Cited

U.S. PATENT DOCUMENTS

| | | | | |
|---|---|---|---|---|
| 6,456,961 | B1 * | 9/2002 | Patil et al. .................. 703/14 |
| 6,523,136 | B1 * | 2/2003 | Higashida ................... 714/30 |
| 6,539,522 | B1 * | 3/2003 | Devins et al. ................ 716/5 |
| 6,560,734 | B1 * | 5/2003 | Whetsel ..................... 714/724 |
| 6,631,504 | B2 * | 10/2003 | Dervisoglu et al. ........... 716/4 |
| 6,643,810 | B2 * | 11/2003 | Whetsel ..................... 714/724 |
| 6,678,645 | B1 * | 1/2004 | Rajsuman et al. ............ 703/20 |
| 6,686,759 | B1 * | 2/2004 | Swamy ...................... 324/765 |
| 6,751,723 | B1 * | 6/2004 | Kundu et al. ................ 712/36 |
| 6,775,799 | B1 * | 8/2004 | Giorgetta et al. ............ 714/751 |
| 6,876,941 | B2 * | 4/2005 | Nightingale ................ 702/120 |
| 6,901,457 | B1 * | 5/2005 | Toombs et al. .............. 710/11 |
| 6,948,105 | B2 * | 9/2005 | Rajsuman ................... 714/724 |
| 2001/0037480 | A1 * | 11/2001 | Whetsel ..................... 714/727 |
| 2002/0046324 | A1 * | 4/2002 | Barroso et al. .............. 711/122 |
| 2002/0070725 | A1 * | 6/2002 | Hilliges .................... 324/158.1 |
| 2003/0005380 | A1 * | 1/2003 | Nguyen et al. .............. 714/736 |

OTHER PUBLICATIONS

D.A.Patterson and J.L. Hennessy. Computer Organization & Design: The Hardware/Software Interface. Morgan Kaufmann, San Francisco, C. A., 1997, pp. 556-558.*
Jing-Reng Huang et al., "A Self-Test Methodology for IP Cores in Bus Based Programmable SoC's", 2001, IEEE, pp. 198-203.*
L. Chen and S. Dey. Defuse: A Deterministic Functional Self-Test Methodology for Processors. In VLSITS, pp. 255-262, 2000.

(Continued)

*Primary Examiner*—Hal D Wachsman
(74) *Attorney, Agent, or Firm*—Sughrue Mion, PLLC

(57) ABSTRACT

A test system for a circuit board, wherein the circuit board has a plurality of cores such that at least one of the plurality of cores is adapted to use a test protocol independent of a communication fabric used in the circuit board. A system-on-chip (SOC) with an embedded test protocol architecture, the SOC comprising at least one embedded core, a communication fabric that connects at least one embedded core, at least one test server; and at least one test client connected to said at least one embedded core and connected to the communication fabric.

31 Claims, 10 Drawing Sheets

Table 1: Area overhead and Test Application time Tatt

| SOCs | cores | area overhead | # bus cycles | |
|---|---|---|---|---|
| | | | case1 | case2 |
| SOC1 | Xtensa processor | - | - | - |
| | b14 + Test Client 16 | 9349 (27.44%) | 4612 | 8708 |
| | b17 + Test Client 32 | 8397 (6.90%) | 23556 | 16900 |
| | b20 + Test Client 16 | 9349 (13.97%) | 8707 | 107012 |
| | 4 Bus Interfaces | - | - | - |
| Overall | - | 27095 (3.60%) | 32268 (87.5%) | 47628 (65.96%) |
| SOC2 | Xtensa processor | - | - | - |
| | b17 + Test Client 32 | 8397 (6.90%) | 23556 | 16900 |
| | b18(32) + Test Client 32 | 8397 (2.42%) | 53764 | 107012 |
| | 3 Bus Interfaces | - | - | - |
| Overall | - | 16794 (1.68%) | 77320 (100.0%) | 107528 (70.0%) |
| SOC3 | Test co-processor | 4620 (100.0%) | - | - |
| | b15 + Test Client 16 | 9349 (23.99%) | 8196 | 46596 |
| | b18(16) + Test Client 16 | 8397 (2.42%) | 53764 | 107012 |
| | b21 + Test Client 16 | 9349 (13.37%) | 8707 | 16900 |
| | b22 + Test Client 16 | 9349 (9.24%) | 12292 | 24068 |
| | 5 Bus Interfaces | - | - | - |
| Overall | - | 41064 (7.16%) | 72972 (87.96%) | 80912 (49.37%) |

OTHER PUBLICATIONS

V. Dabholkar, S. Chakravarty, I. Pomeranz, and S. Reddy. Techniques for Minimizing Power Dissipation in Scan and Combinational Circuits During Test Application. IEEE Trans. on Computer-Aided Design of Integrated Circuit and System, vol. 17(12), Dec. 1998.

J.-R. Huang, M. K. Iyer, and K.-T. Cheng. A Self-Test Methodology for IP Cores in Bus-Based Programmable SoCs. In VLSITS, pp. 198-203, 2001.

Sonics Inc. Open Core Protocol Specification 1.0. Sonics Inc, Jan. 2000.

Tensilica Inc. Xtensa Software Development Toolkit. Tensilica Inc., 2000.

H. C. Tsai, K.T. Cheng, and S. Bhawmik. On Improving Test Quality of Scan-Based BIST. IEEE Trans. on Computer-Aided Design of Integrated Circuit and System, vol. 19(8): 928-938, Aug. 2000.

* cited by examiner

Table 2: Embedded Cores

| designs | # grids | # flip-flops | # chains | MSCL | # bus cycles case1 | # bus cycles case2 |
|---|---|---|---|---|---|---|
| b14 | 34067 | 245 | 16 | 16 | 4612 (2564) | 8708 (4612) |
| b15 | 38959 | 449 | 16 | 29 | 8196 (4356) | 46596 (8196) |
| b17 | 121560 | 1415 | 32 | 45 | 23556 (12036) | 16900 (23556) |
| b18 (16) | 345586 | 3320 | 16 | 208 | 53764 (27140) | 107012 (53764) |
| b18 (32) | 345586 | 3320 | 32 | 104 | 53764 (27140) | 15876 (53764) |
| b20 | 66898 | 490 | 16 | 31 | 8707 (4612) | 107012 (8707) |
| b21 | 69919 | 490 | 16 | 31 | 8707 (4612) | 16900 (8707) |
| b22 | 101177 | 735 | 16 | 46 | 12292 (6404) | 24068 (12292) |
| Xtensa Processor | 518983 | - | - | - | - | - |
| Test Co-processor | 4620 | - | - | - | - | - |
| Bus Interface | 2650 | - | - | - | - | - |
| Test Client 16 | 9349 | - | - | - | - | - |
| Test Client 32 | 8397 | - | - | - | - | - |
| Test Client 64 | 10962 | - | - | - | - | - |

FIG. 9

Table 1: Area overhead and Test Application time Tatt

| SOCs | cores | area overhead | # bus cycles | |
| --- | --- | --- | --- | --- |
| | | | case1 | case2 |
| SOC1 | Xtensa processor | - | - | - |
| | b14 + Test Client 16 | 9349 (27.44%) | 4612 | 8708 |
| | b17 + Test Client 32 | 8397 (6.90%) | 23556 | 16900 |
| | b20 + Test Client 16 | 9349 (13.97%) | 8707 | 107012 |
| | 4 Bus Interfaces | - | - | - |
| Overall | | 27095 (3.60%) | 32268 (87.5%) | 47628 (65.96%) |
| SOC2 | Xtensa processor | - | - | - |
| | b17 + Test Client 32 | 8397 (6.90%) | 23556 | 16900 |
| | b18(32) + Test Client 32 | 8397 (2.42%) | 53764 | 107012 |
| | 3 Bus Interfaces | - | - | - |
| Overall | | 16794 (1.68%) | 77320 (100.0%) | 107528 (70.0%) |
| SOC3 | Test co-processor | 4620 (100.0%) | - | - |
| | b15 + Test Client 16 | 9349 (23.99%) | 8196 | 46596 |
| | b18(16) + Test Client 16 | 8397 (2.42%) | 53764 | 107012 |
| | b21 + Test Client 16 | 9349 (13.37%) | 8707 | 16900 |
| | b22 + Test Client 16 | 9349 (9.24%) | 12292 | 24068 |
| | 5 Bus Interfaces | - | - | - |
| Overall | | 41064 (7.16%) | 72972 (87.96%) | 80912 (49.37%) |

FIG. 10

RE-CONFIGURABLE EMBEDDED CORE TEST PROTOCOL FOR SYSTEM-ON-CHIPS (SOC) AND CIRCUIT BOARDS

RELATED APPLICATIONS

This Application claims priority from U.S. Provisional Application Ser. No. 60/361,057 filed Mar. 1, 2002, which is incorporated in its entirety by reference.

FIELD

This disclosure teaches techniques related to testing where a circuit board has multiple cores and test schemes are used that are independent of the communication architecture used in the circuit boards. Similar techniques for a system-on-chip are also taught.

BACKGROUND

1. References

The following papers provide useful background information, for which they are incorporated herein by reference in their entirety, and are selectively referred to in the remainder of this disclosure by their accompanying reference codes in square brackets (i.e., [DCPR98] for the paper by V. Dhabolkar et al.):

[CD00] L. Chen and S. Dey. Defuse: A Deterministic Functional Self-Test Methodology for Processors. In VLSITS, pages 255-262, 2000.

[DCPR98] V. Dabholkar, S. Chakravarty, I. Pomeranz, and S. Reddy. Techniques for Minimizing Power Dissipation in Scan and Combinational Circuits During Test Application. IEEE Trans. on Computer-Aided Design of Integrated Circuit and System, Vol. 17(12), December 1998.

[Gro00] OCB Design Working Group. VSI Alliance Virtual Component Interface Standard. Virtual Socket Interface Alliance, November 2000.

[HIC01] J. -R. Huang, M. K. Iyer, and K. -T. Cheng. A Self-Test Methodology for IP Cores in Bus-Based Programmable SoCs. In VLSITS, pages 198-203, 2001.

[Inc00a] Sonics Inc. Open Core Protocol Specification 1.0. Sonics Inc, January 2000.

[Inc00b] Tensilica Inc. Xtensa Software Development Toolkit. Tensilica Inc., 2000.

[PH97] D. A. Patterson and J. L. Hennessy. Computer Organization & Design: The Hardware/Software Interface. Morgan Kaufmann, San Francisco, Calif., 1997.

[TCB00] H. C. Tsai, K. T. Cheng, and S. Bhawmik. On Improving Test Quality of Scan-Based BIST. IEEE Trans. on Computer-Aided Design of Integrated Circuit and System, Vol. 19(8): 928-938, August 2000.

2. Introduction

It should be noted that the disclosure discusses system-on-chips (SOC) in greater detail. However, a skilled artisan will know that the techniques are similar for a general circuit board. For example, instead of an SOC the technique are equally applicable to a circuit board with individual chips residing on it, with each chip being designated as a core.

Testing of complex system-on-a-chip (SOC) designs that contain a large number of heterogeneous embedded cores poses significant challenges. Use of external automatic test equipment (ATE) to test these SOCs is becoming increasingly impractical. The basic capabilities of automatic test equipment are becoming increasingly inadequate for device scaling trends toward lower voltage, greater transistor and pincount, improved accuracy, and mixed analog/digital signals. External pattern volume required to adequately test the SOC far exceeds the memory available in state-of-the art ATE to store patterns. Large pattern sets result in impractical test application times. Embedded test techniques that incorporate micro-testers on-chip are emerging as a viable alternative to the conventional ATE-based test approach. These techniques are becoming necessary to augment the limited capabilities of ATE. Without such effort, it will be difficult to keep the SOC test costs in check.

Decreasing device feature sizes are enabling huge device transistor counts, and it is now practical to include embedded cores that primarily assist in facilitating on-chip testing. Large scale SOCs typically contain one or more stand alone on-chip processors that can also be harnessed to provide embedded test support. Utilizing on-chip micro-testers (processors or embedded test cores) to conduct test application is a cost effective alternative to traditional test methods that employ expensive ATE.

3. Background to the Technology and Related Work

In this section, we discuss several aspects of related work, including background and conventional technologies. A software-based test methodology to test bus-based SOC is also proposed in [HIC01]. The test protocol proposed in [HIC01] is intimately tied to a specific bus protocol (PCI bus). Test data is delivered to embedded cores using the PCI bus protocol. Therefore, if the communication fabric of the SOC is re-designed or refined to use the newer high-speed on chip-buses or bus hierarchies, then the entire embedded test support has to be re-designed. Most on-chip SOC communication architectures are custom designed. This is because the communication architecture can be tailored to meet specific, custom communication requirements of the embedded application implemented in the SOC.

A recent proposal [HIC01] uses multiplexers at all inputs of the embedded core to select between normal and test inputs. The additional multiplexers can adversely affect the timing of data paths by increasing the delay of critical paths during normal operation of the embedded core. For example, consider again a recent proposal for SOC testing [HIC01]. A test packet defined in [HIC01] consists of a 4-bit test command field, 9-bit sequence number field, 3-bit unused field and a test data field that occupies the rest of the packet. Since a 32-bit PCI bus architecture is assumed to be the communication fabric, only 16 bits of a bus word are used to carry test data to embedded cores. Ideally, we would like to use all bits in the word to carry test data. If the size of the packet is 32 bits, then only half of each packet is used to carry test data to embedded cores. In [HIC01], a packet consisting of less than 32 bits requires can be delivered to an embedded core in one bus transaction. However, to deliver packet that consists of more than 32 bits of test data, a PCI burst mode is used. During a burst, a bus master holds the bus for multiple bus cycles, and a word of data is sent to the embedded core during every cycle. Since the receiver usually requires multiple bus cycles to process one word of data, data received during burst mode has to stored in buffers. These buffers result in a significant test logic area overhead. This overhead is more for cores that require a large amount of test data.

SUMMARY

To overcome the disadvantages discussed above, the disclosed teachings provide a test system for system on chips (SOC) wherein said SOC has a plurality of cores such that at least one of said plurality of cores is adapted to use a test protocol independent of a communication fabric used in the SOC.

More specifically, one of said plurality of cores is adapted to use multiple test schemes.

More specifically, a first one of said plurality of cores and a second one of said plurality of cores are from different vendors.

Still more specifically, the system is adapted to use a uniform SOC-level test strategy for said plurality of cores.

More specifically, a first one of said plurality of cores is adapted to use a first test scheme and a second one of said plurality of cores is adapted to use a second test scheme different from said first test scheme.

More specifically, no delay is added to paths in the SOC.

More specifically, test application time of a first one of said plurality of cores overlap a test application time of a second one of said plurality of cores.

Another aspect of the disclosed teachings is a system-on-chip (SOC) with an embedded test protocol architecture, said SOC comprising at least one embedded core, a communication fabric that connects said at least one embedded core, at least one test server; and at least one test client connected to said at least one embedded core and connected to the communication fabric.

More specifically, wherein said at least one embedded core connects to the communication fabric using bus interface logic.

More specifically, said test server is implemented as an embedded core.

More specifically, said test server is implemented on an on-chip processor core.

Still more specifically, the bus interface logic connects only to inputs and outputs of said at least one embedded core.

More specifically, test client is connected only to test ports of the embedded core.

Still more specifically, test client delivers test data to the embedded core by using the test ports.

More specifically, the communication fabric is a bus.

Still more specifically, the test server operates as a sole bus master.

More specifically, said at least one test server and said at least one test client are adapted to exchange information using a fixed-format packet.

Still more specifically, the packet is variable sized.

Still more specifically, the SOC is adapted to transmit the packet using multiple bus transactions.

Still more specifically, the packet comprises a header and a payload.

Still more specifically, the test client treats all data received after a header as payload until it receives another header.

Another aspect of the disclosed teachings is a test client for use with a system-on-chip (SOC) with an embedded test protocol, said client comprising: a bust interface block that generates communication signals required to plug the test client into a communication fabric of the SOC, a core interface block that converts test data into serial data streams; and a controller block that interprets received test packets.

More specifically, the test core interface block converts responses from embedded cores of the SOC into packets.

Still More specifically, the controller block further comprises a decoder for interpreting received test packets and a finite state machine that provides necessary signals to control the core interface block and the bus interface block.

Another aspect of the disclosed teachings is a test system for a circuit board, wherein said circuit board has a plurality of cores such that at least one of said plurality of cores is adapted to use a test protocol independent of a communication fabric used in the circuit board.

BRIEF DESCRIPTION OF THE DRAWINGS

The above objectives and advantages of the disclosed teachings will become more apparent by describing in detail preferred embodiments thereof with reference to the attached drawings in which:

FIG. 9 shows a table depicting the characteristics of the embedded cores that were used in our experiments.

FIG. 10 shows a table that depicts the area overhead due to the embedded core test protocol, and the test application time for several SOC designs.

DETAILED DESCRIPTION

A. Synopisis

Figure 1:
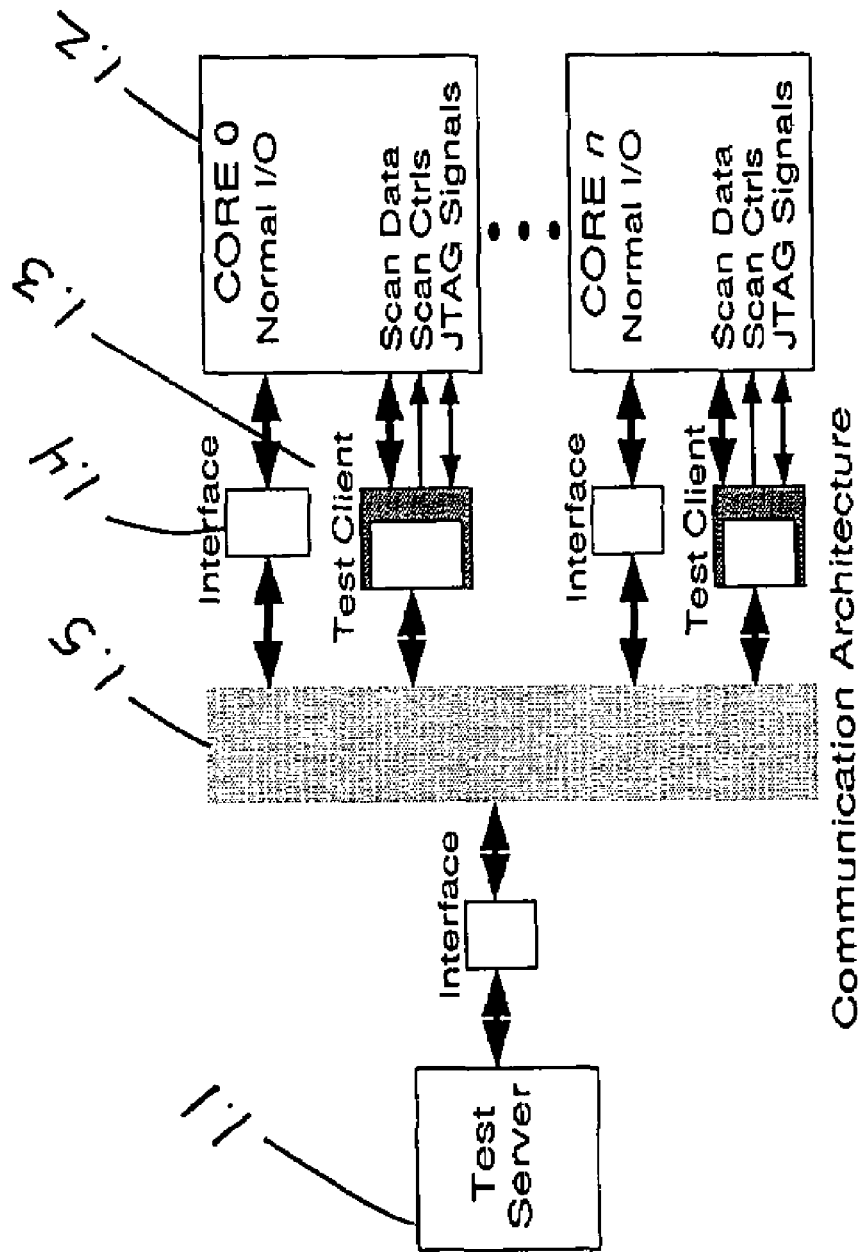
FIG. 1 shows SOC-level embedded test protocol architecture.

We propose a new, reconfigurable, packet-based, embedded test protocol for testing a multi-core SOC. Our protocol supports several design-for-testability (DFT) methodologies including popular methods like scan, boundary scan, and built-in self-test (BIST). Our protocol can also be used for SOCs with non-scan cores. However, we require that clocks of the non-scan cores can be controlled by the Test Client. We assume that the DFT structures in each embedded core are known in advance. The Test Server reconfigures the Test Client (by sending appropriate commands) to invoke different DFT modes in the embedded core. Also, BIST functions such as random pattern generation and signature analysis functions can be included in the Test Client to reduce the number of test packets that have to be delivered from the Test Server. This can significantly reduce the traffic on the communication fabric, as well as the overall test application time for the SOC.

Using our protocol, SOC designers can integrate cores from multiple-vendors and still use a uniform SOC-level test strategy that works in conjunction with core-specific test support. The key features of our embedded test protocol are: (1) unlike prior proposals, our core test protocol is independent of the specific communication fabric used in the SOC, (2) the proposed test methodology does not require any intrusion on the critical paths in the SOC, and (3) test application times for embedded cores can be overlapped to reduce the overall test application time for the SOC. Due to communication architecture independence, the test program that implements the proposed test protocol can be reused without any modification even if the SOC communication fabric is redesigned. Since we do not add any delay to paths in the embedded core that are exercised during normal operation, our test protocol can be implemented without any performance degradation for the core. The proposed test protocol has been implemented and verified in several SOCs that use a commercial reconfigurable processor and several embedded cores. Test server, client and all other cores in the SOC were implemented in a 0.13-micron process technology. Experimental results show that our new test protocol can be implemented with extremely low (less than 2% to 7%) hardware overhead.

This disclosure teaches a reconfigurable, packet-based, embedded test protocol that supports several popular test methodologies (boundary scan, full-scan and BIST among others) for testing a multi-core SOC. Each embedded core in the SOC can support a different test methodology. With the disclosed techniques, SOC designer can integrate IP cores from multiple-vendors and still use a uniform SOC-level test strategy that works in conjunction with core specific test support. The protocol is implemented using two embedded cores: Test Server and Test Client. There is one Test Server for the entire SOC, and there is one Test Client for each embedded core in the SOC. The Test Client can be configured to interface with specific test structures that are already part of the custom or third-party embedded core. Test Server delivers test parameters (for example, they could be compressed patterns), as test packets, to the Test Client. The Test Client converts test parameters to test patterns that are suitable for application to the embedded core. Test response from the embedded core is collected, compressed if necessary, and analyzed jointly by the Test Server and Client. The proposed test protocol has been implemented in SOCs with several embedded cores. Test Server, Client and all other cores in the SOC were implemented in a 0.13-micron process technology. For our designs, the area overhead due to embedded test was 1.70%. Our methodology entails no performance overhead to the 150 MHz SOC clock. Experimental results on several SOCs are reported in Section IV.F.

We describe the reconfigurable embedded test protocol in Section IV.B. Test Client and Test Server architectures are discussed in Sections IV.C and IV.D. Section IV.E illustrates the use of the test protocol on a simple example. The proposed test protocol has been implemented and verified on several SOC designs. Section IV.F reports experimental results on several SOC designs.

Our new test protocol is packet-based and independent of the communication fabric employed by the SOC. Due to communication architecture independence, the test program that implements the proposed test protocol can be reused without any modification even if the SOC communication fabric is re-designed.

Unlike some of the conventional techniques, our methodology entails no performance degradation during normal operation of the embedded core. This is because we do not add any delay to paths in the embedded core that are exercised during normal operation. Therefore, our test protocol does not result in any performance degradation for the normal operation of the embedded core.

Another difference between prior proposals and our method is related to the complexity of the test logic that interfaces with each embedded core. A prior proposal uses PCI burst mode to deliver test data that is larger than the number of bits (word) that can be transferred in one bus cycle. In the burst mode, a bus master holds the bus for multiple bus cycles, and large volume of data arrives quickly at the test logic of the embedded core. Since the test logic typically requires multiple bus cycles to process a single word, the test logic must have buffers to store the PCI burst of test data. These buffers result in a significant test logic area overhead. This overhead is more for cores that require a large amount of test data. However, in our test protocol, we do not assume a burst mode. Therefore, a test packet can be delivered in several, non-consecutive bus transactions. Our test protocol is designed in such a way that the Test Client does not require any buffers. This drastically reduces the test area overhead due to Test Clients.

B. Embedded Test Protocol

1. Protocol Architecture

FIG. 1 shows SOC-level embedded test protocol architecture. The SOC consists of several embedded cores and a communication fabric that provides packet-level connectivity between various embedded cores. For example, communication architecture can be realized as a single bus, a hierarchy of buses that are connected using bridges, or as a packet-delivery mechanism. Test Server 1.1 can be implemented as a separate embedded core or its functionality can be provided by using an on-chip processor core. Every embedded core is connected to the communication fabric using suitable bus interface logic. In addition, every core is also connected to a Test Client. There is one Test Client 1.3 for each core 1.2. All Test Clients are connected to the communication fabric (or communication architecture 1.5 ) as well. Test Clients are assigned different addresses so that they can be accessed by the Test Server during test application. Bus interface logic 1.4 connects only to the embedded core inputs and outputs. Test Client only connects to the test ports of the embedded core. For example, test ports can include scan inputs and outputs, and boundary scan test access ports (TAPs).

Note that normal inputs and outputs of each embedded core are not connected to the Test Client. Therefore, if necessary, the Test Server can directly deliver test patterns or collect test responses from the embedded core, without using the Test Client. This scheme is unlike some conventional proposals that use multiplexers at all inputs of the embedded core to select between normal and test inputs. Note that the additional multiplexers adversely affect the timing of the normal data path by increasing the critical path. In contrast, the proposed methodology entails no performance degradation during normal operation of the embedded core. In the test mode, Test Client delivers test data to the embedded core by using test ports such as scan chain inputs and outputs, and/or boundary scan TAPs. If the communication architecture is implemented as a bus, then only the Test Server initiates bus transactions. Hence, only the Test Server operates as a bus master and Test Clients do not explicitly request for bus access.

2. Packet Format

Our embedded test protocol is independent of the specific communication fabric used in the SOC. Information between the Test Server and Test Clients is exchanged as variable-sized, fixed-format packets. For example, Test Server can communicate a set of test patterns (possibly obtained along with the embedded core from a third-party core vendor) to the Test Client with explicit instruction to apply patterns to specific test inputs like scan inputs or boundary scan test access ports (TAPs). The size of a packet can vary depending on the type of test inputs that the test patterns have to be applied to. For example, test packets delivered to scan inputs of an embedded core can be longer than those delivered to the boundary scan TAPs of the same core.

Figure 2:
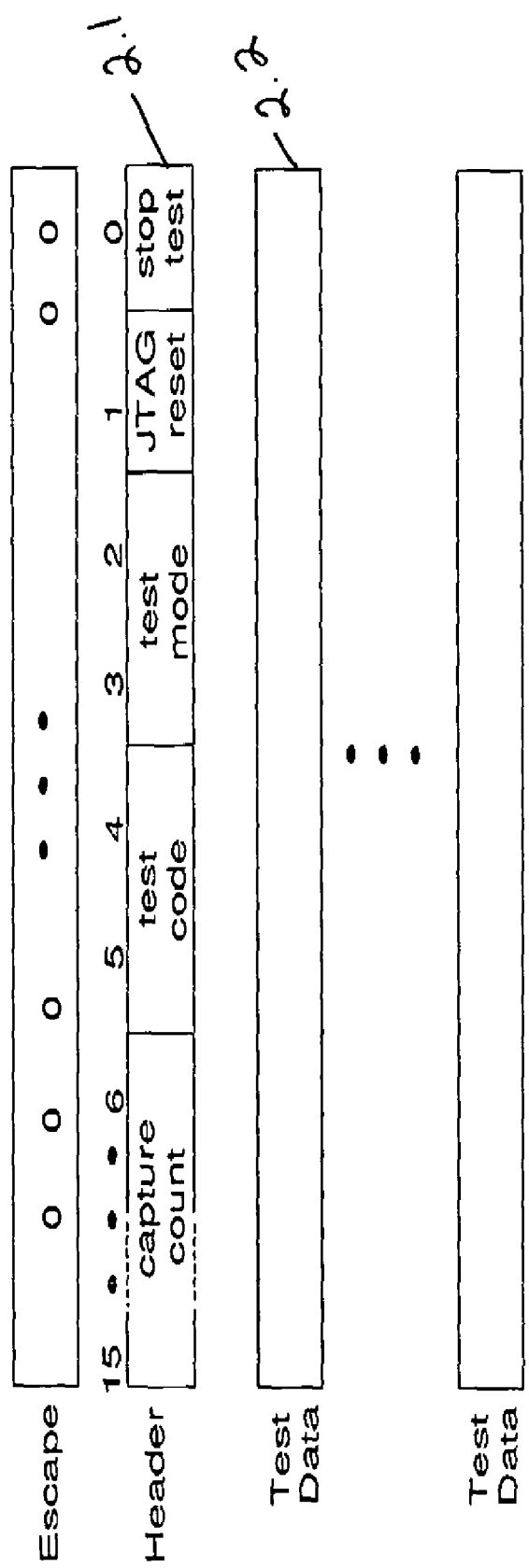
FIG. 2 shows the format of a test packet.

We use fixed-format test packets. All test packets consist of a header and a payload (test data 2.2). FIG. 2 shows the format of a test packet. The header 2.1 includes two fields: a 16-bit escape sequence and a 16-bit test instruction. Payload consists of zero or more bits. We use the term word to refer to the number of bits that are delivered to an embedded core in one clock cycle of the communication architecture. For example, if the communication architecture is a bus, then a word is equivalent to the width of the system bus. Since the header in our protocol consists of two 16-bit fields, our header can fit into a 16-bit or wider system bus.

Since our protocol is independent of the communication architecture, a test packet can be delivered to the Test Client using multiple bus transactions. This is necessary since several implementations are possible for the communication architecture and these implementations may user different bus-widths. We distinguish between the beginning of a new packet, and the continuation of an old packet by using the escape sequence. In our protocol, the escape sequence consists of 16 bits that are all set to 0. The escape sequence delineates test packets. It is possible that payload from the Test Server may include the special bit pattern being used as escape sequence. If this happens, then Test Server replaces the escape sequence in the payload with two consecutive escape sequences. With such a scheme, it is not necessary to include additional bits in the header to indicate the length of the payload. If a Test Client receives two consecutive escape sequences, then these bits are part of payload of a packet. A Test Client strips one of the escape sequence, and treats the other as data bits.

The test instruction contains commands to control the Test Client. In our protocol, a command delivered to the Test Client is valid until the Test Client receives a new command. For example, if the Test Client receives a command to initiate a scan shift operation, then packets received subsequently are assumed to be scan data. This data will be scanned in to the scan chains until a packet with a new command is received by the Test Client. This significantly reduces the number of packet transfers and the storage required by the Test Client to store test data. The test instruction field is further divided into five sub-fields. The Capture_count sub-field is used to support a multiple capture scheme [TCB00]. This sub-field specifies the number of cycles of the normal embedded core clock that should elapse before test response capture during scan testing. This field is used to inform the Test Client of the number of data packets required to construct enough data to shift the scan chains in the core by one clock cycle in the case where the number of scan chains in the core is greater than the width of the system bus (the word size of packets). The test mode field specifies the test methodology to be used for the embedded core: scan testing, boundary scan operation, or non-scan testing. The test code field specifies the write, shift, read, and capture operations that will be performed during boundary scan or scan testing. The 3TAG reset field specifies if the TAP controller has to be reset or not. Finally, the stop test field is used to disable the test mode of the Test Client.

Payload field in a packet is optional. Packets with no payload are command packets that provide test directives to the Test Client. Bits intended for internal and boundary scan chains are formatted (serial to parallel) by the Test Client before they are scanned into scan chains.

3. Packet-Based Protocol

Unlike [HIC01] where a test packet should be delivered in one bus transaction, the proposed test protocol allows a test packet to be delivered in multiple bus transactions. If the test packet is delivered in one bus transaction, then the embedded core requires large buffers to store test data. The buffers become necessary due to the reasons. Typically, one scan enable signal drives all scan flip-flops in the core. Hence, in order to drive scan flip-flops at the system clock speed, it is necessary to build a very sophisticated clock tree for scan enable signal to meet the timing requirements of scan flip-flops. This may require hardware overhead as high as the clock tree for the system clock. Furthermore, since significantly higher switching activity can occur during scan shift operations than normal operations [DCPR98], shifting scan flip-flops at the system clock speed during scan shift operations can cause heat dissipation that exceeds the thermal capacity of the chip. Therefore, scan shift clock of an embedded core is often slower than the bus clock. This results in test patterns to be delivered the embedded core at a rate that is faster than the rate at which they are processed (scanned into scan chains) by the embedded core. Hence, it is necessary to buffer delivered test patterns by storing them into a memory before they are scanned into scan chains. [HIC01] uses a 32-bit register for each scan chain in the core to store test patterns temporarily. Note that hardware overhead incurred to build buffers for embedded cores that have many scan chains can be significant. Since the proposed test protocol can deliver a test packet in multiple bus transactions, as explained below, we do not need large buffers.

Figure 3:
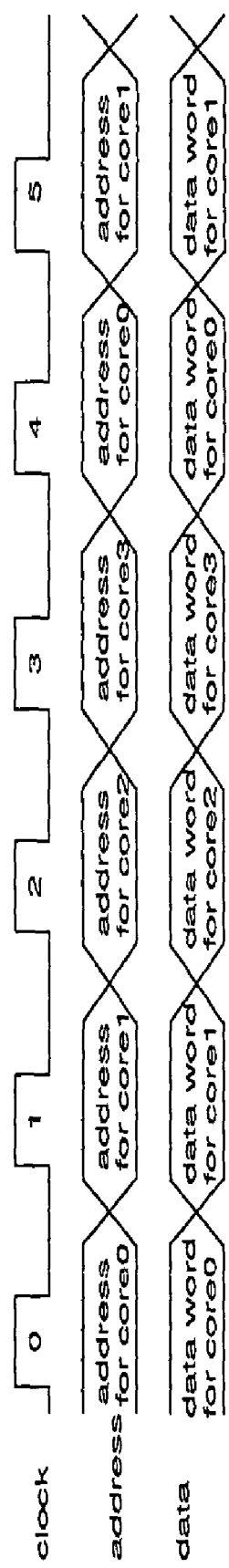
FIG. 3 shows the data and address signals of an on-chip bus in an SOC.

A key feature of our protocol is that each test packet can stride over multiple bus transactions. Test Clients interpret all data received after a header as payload of the packet until they receive another header. Therefore, Test Server can deliver test data to other embedded cores even before a core has not yet received and processed a packet. This overlap in test data communication time with test data processing time significantly reduces the overall test application time. As an example, consider the example in FIG. 3. It shows the data and address signals of an on-chip bus in an SOC. Four cores (core0, core1, core2, and core3) use the on-chip bus to communicate with each other. During the first bus cycle, the Test Server delivers a test data word to core0 by assuming control of the bus. While core0 is receiving and processing the test data, the Test Server delivers a data word to core1, core2, and core3. Therefore, during the time it takes core0 to process the test data, the communication fabric does not remain idle. Note that due to the special considerations taken in the design of the test protocol, no header is sent by the Test Server between payload words bound for different embedded cores in the SOC. By allowing a test packet to stride over several bus transactions, our protocol can be implemented on communication architectures that support split-transaction protocols [PH97]. This improves the effective bus bandwidth for the entire SOC.

Our protocol also simplifies the design of the Test Client compared to prior approaches.

In our test protocol, we do not assume a burst mode. A test packet can consist of any number of bits (fixed-format, but variable sized packets) and these bits can be delivered in several, non-consecutive bus transactions. Therefore, our test protocol is designed in such a way that the Test Client does not require any buffers. This drastically reduces the test area overhead due to Test Clients.

C. Test Client

Figure 4:
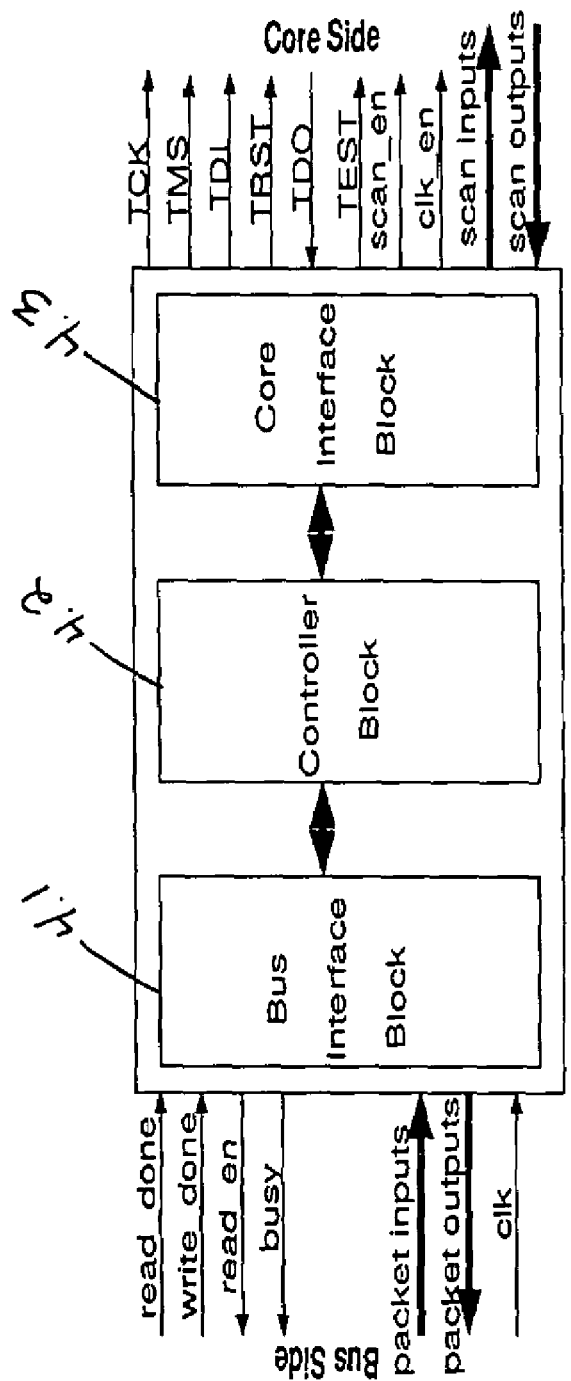
FIG. 4 shows the architecture of the Test Client.

FIG. 4 shows the architecture of an example implementation of a Test Client. It consists of three blocks: a bus interface block 4.1, a core interface block 4.2, and a controller block 4.3. The bus interface block performs several functions. It generates communication signals that are required to plug into the communication fabric of the SOC, and to facilitate movement of data between the Test Server and the Test Client. The bus interface block design is specific to the communication fabric used in the SOC. As an example, the Virtual Socket Interface (VSI) Alliance recently released the Virtual Component Interface (VCI) standard [Gro00]. The VCI standard specifies a family of point-to-point communication protocols that facilitate communication between the virtual components or embedded cores (possibly created by different core vendors) in the SOC. The current VCI standard consists of three protocols: the Peripheral Virtual Component Interface (PVCI), the Basic Virtual Component Interface (BVCI) and the Advanced Virtual Component Interface (AVCI). Note that AVCI is a superset of BVCI, and BVCI is a superset of PVCI. For the three protocols, the VCI standard specifies the interface between virtual component (VC) cores and the on-chip bus (OCB) wrappers. The VC interface consists of a set of wires between the VC and the bus wrapper. While PVCI is simple, BVCI requires complex control since it supports split-transactions. Hence, additional logic is necessary to connect the VC interface to the bus wrapper. The bus interface block in the Test Client includes all signals necessary to interface with the communication fabric.

The core interface block converts test data received from the bus interface block into serial data streams that are suitable for being scanned into internal scan chains and/or boundary scan TAPs. This block also converts test responses from scan outputs and TDO port of the embedded core into a data packet that can be read by the Test Server.

Figure 5:
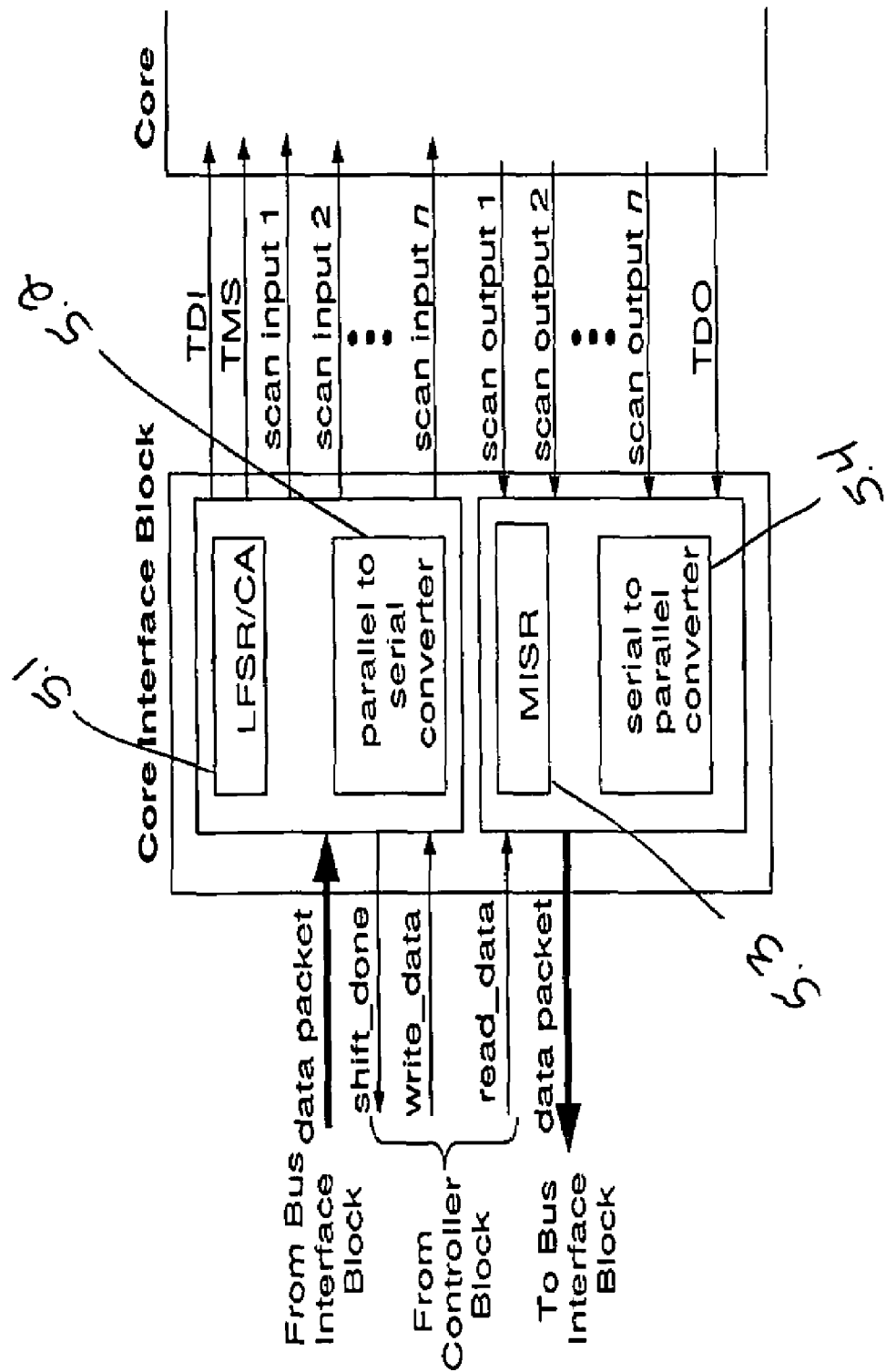
FIG. 5 shows a block diagram of the core interface block.

FIG. 5 shows a block diagram of the core interface block. The optional block LFSR/CA 5.1 stands for linear feed shift register and cellular automata, respectively. The LFSR and CA are widely used as random pattern generators for built-in self-test circuits.

Another optional block MISR 5.3 stands for multiple input signature register. The MISR is also widely use as signature analyzer for built-in self-test circuits to compress responses to test patterns that are applied to circuits under test.

Built-in self-test (BIST) functions provided by the LFSR/CA and MISR blocks to reduce bus transactions. Three advantages accrue:

(1) decrease in overall test application time for the SOC due to the markedly lower number of bus transactions between the Test Server and a Test Client, (2) decrease in the amount of test data (patterns and responses) to be stored in on-chip memory (memories) accessed by the Test Server, and (3) decrease in time necessary to load on-chip memories with test data from external storage when test data volume is too large to fit into on-chip memories.

The parallel to serial converter block 5.2 coverts test data received from the bus interface block into serial data streams that are suitable for being scanned into internal scan chains and/or boundary scan TAPs. Similarly, the serial to parallel converter block 5.4 converts test responses from scan outputs and TDO port of the embedded core into a data packet that can be read by the Test Server.

Built-in self-test (BIST) functions, like pattern generation and signature analysis, can be provided by the core interface block to reduce bus transactions. Three advantages accrue: (1) decrease in overall test application time for the SOC due to the markedly lower number of bus transactions between the Test Server and a Test Client, (2) decrease in the amount of test data (patterns and responses) to be stored in on-chip memory (memories) accessed by the Test Server, and (3) decrease in time necessary to load on-chip memories with test data from external storage when test data volume is too large to fit into on-chip memories.

The controller block consists of a decoder and a finite state machine (FSM). The decoder interprets test packets received from the Test Server (via the bus interface block) and generates input signals for the FSM. The FSM provides the necessary signals to control the bus and core interface block. Our FSM supports scan, boundary scan, and non-scan testing.

Figure 6:
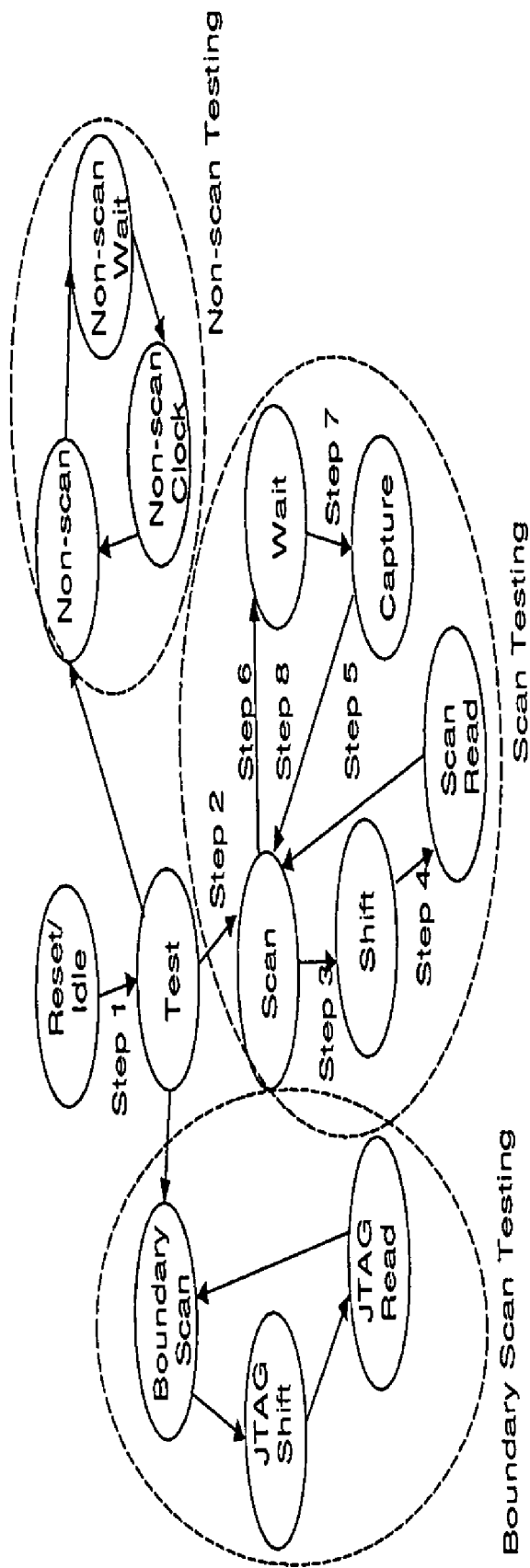
FIG. 6 shows the state transition diagram of the FSM.

FIG. 6 shows the state transition diagram of the FSM. In the Reset/Idle state, test inputs to the embedded core are disabled and the embedded core exhibits its normal operation. When the Test Client receives a command packet from the Test Server, the FSM transitions to the Test state. The embedded core will be put into a test mode, and inputs from Test Client to the embedded core are now enabled. If the Test Server sends a command packet to enable scan testing of the embedded core, then the FSM transitions into the Scan state. Boundary scan and non-scan testing are handled in a similar way. The rest of the discussion in this section illustrates state transitions for scan testing of the embedded core.

After receipt of the command packet, the Test Client awaits the next word from the Test Server. If the next word received is a data word, then the FSM transitions to the Shift state. This initiates a scan shift operation. Note that while data is being shifted into the scan chains, response from the embedded core is also scanned out of the embedded core's scan chains as a serial bit stream. The FSM transitions to the Scan Read state at the end of the scan shift operation. The FSM stays in the Scan Read state until the Test Server reads the response data from the Test Client. The FSM moves back to the Scan state after Test Server reads the response data.

Now, the FSM is ready to receive more scan data or test instructions. If the Test Client receives a bit stream other than the escape sequence, then this data is treated as scan data. If the Test Client receives an escape sequence, then the FSM waits for another word. If this word is also an escape sequence, then the Test Client interprets the two consecutive escape sequences as one scan data word that has all 0 bits. If the second word does not include an escape sequence, then it is interpreted as a test instruction. A new test packet has begun and FSM transitions to the Test, Boundary Scan, Non-scan or the Wait state, depending on the test instruction.

Note that the FSM loops between the Scan, Shift and Scan Read state until all scan data has been delivered to the embedded core. In the Shift state, data received from the Test Server is formatted, and scanned into the scan chains of the embedded core. The response from the embedded core is scanned out of the embedded core's scan chains as a serial bit stream. This happens every time new scan data is shifted into the scan chains (i.e., every shift cycle). The Test Client formats the response data stream that will be read by the Test Server.

If the scan chains are fully loaded with a scan pattern, then the Test Server sends an escape sequence, followed by a test instruction that moves the FSM to the Wait state. In the Wait state, the Test Client waits for a capture command from the Test Server. On receipt of the capture command, the FSM transitions to the Capture state. In this state, the Test Client puts the scan chains in the embedded core to be in the capture mode. Since our Test Client supports the multiple capture scheme, capture operation may occur after several cycles. The Test Client maintains a counter that is loaded with the desired number of cycles to wait before a capture is initiated.

Finally, after all scan patterns have been sent to the Test Client, and there are no further tests for the embedded core, a command packet from the Test Server disables inputs between the Test Client and the embedded core.

The boundary scan testing part of the FSM controls boundary scan TAPs, if any, of the embedded core. The operation of the FSM during boundary scan testing is similar to that of the FSM during scan testing. However, since boundary scan testing does not require a capture operation, the state transition diagram for the boundary scan testing does not have the Wait and Capture states. In the Shift state, test data received from the test Server is scanned into the boundary scan TAPs: TDI and TMS. Serial bit-stream scanned out of the embedded core via the TDO port are converted by the Test Client into a data word that can be read by the test master. Since built-in self-test (BIST) is also controlled by the TAP controller, our support for boundary scan testing also covers BIST testing.

The non-scan testing part of the FSM provides a mechanism to control the test clock of the embedded core. In particular, the test clock of the embedded core can be stopped as and when necessary. For example, when a test pattern is applied to the embedded core, then the state of the embedded core should not change until the response to the input test pattern has been read by the Test Server.

Test Clients can be designed with BIST as its test structure. In this case, the controller block of the Test Client can be extended to provide a self-test function for the Test Client itself. This can be achieved by adding a self-test mode to the FSM of the controller block.

D. Test Server

A simple, embedded core (a test co-processor) can be used as the Test Server if the SOC does not have an on-chip processor. The test co-processor has access to the system memory where the test program and data for each embedded core are stored. The Test Server implements three instructions: read data (instructions or test data) from system memory (and send data to a Test Client by using the SOC communication fabric), read immediate data (instruction itself includes immediate data that can be sent to the Test Client), and read from a Test Client and store the data in system memory. The first two instructions are used to send test data to the Test Client while the third instruction is used to collect responses from the embedded core.

Figure 8:
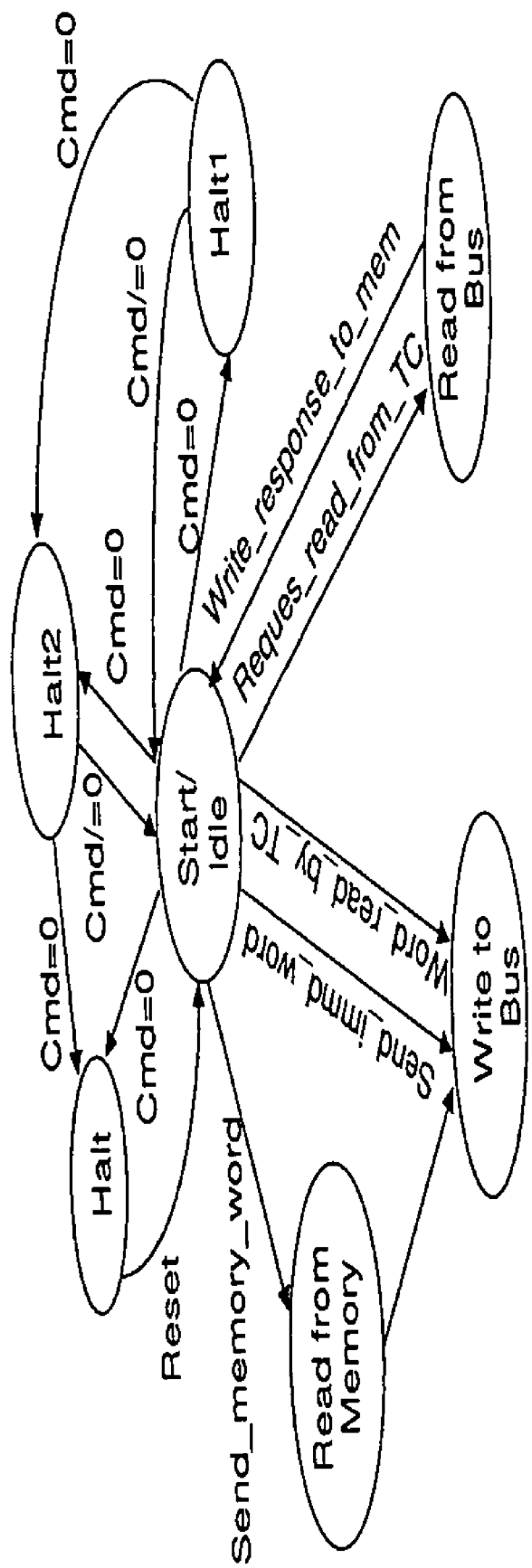
FIG. 8 shows the test co-processor implemented as a finite state machine.

The test co-processor is implemented as a finite state machine shown in FIG. 8. The test co-processor reads the next instruction from memory only when it is in Start/Idle state. Depending on the instruction, Test Server moves to one of the following states. The next state is either Read_from_memory state (this happens if test data in system memory has to be sent to a Test Client), Write_to_bus state (this occurs if the instruction itself supplies an immediate data) or Read_from_bus state. In Read_from_bus state, the test co-processor first sends a request to the Test Client to place the previously scanned out data onto the communication architecture. The Test Server writes this data to system memory (into a memory location that is specified as part of the read instruction). The co-processor halts when it sees three consecutive instructions that are all zeros.

Like the Test Clients, the Test Server itself should be tested before it is used to test other cores. Software-based methodologies ([CD00]) can be used to test the Test Server if an on-chip processor provides the Test Server functionality. If the Test Server is not a processor core, then Test Server core can be designed with BIST support.

E. Protocol in Action: an Example

We illustrate the use of our test protocol to perform scan testing on an example SOC.

Figure 7:
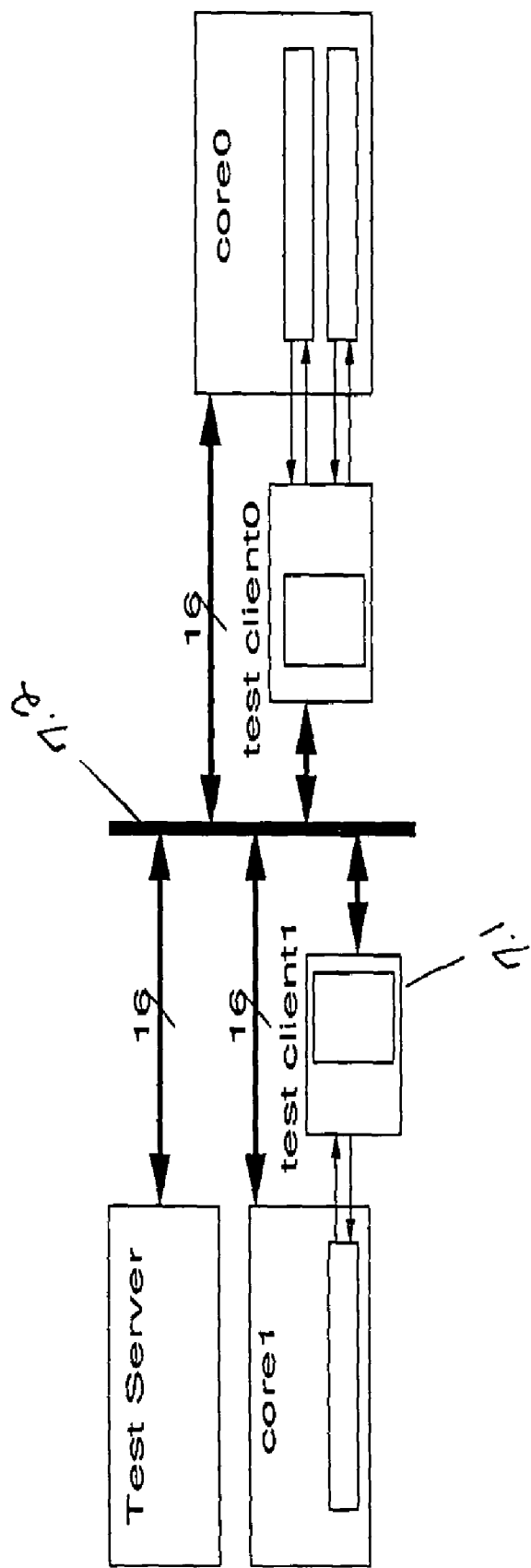
FIG. 7 shows an example SOC.

FIG. 7 shows an SOC that consists of: two embedded cores core0 and core1, a 16-bit bus 7.2 that connects core0, core1 and the Test Server. There is a Test Client 7.1 for each of the embedded cores. For our example, 16 bits are delivered in a single bus transaction. Therefore, a word is 16-bit wide. Assume that core0 has 2 scan chains, and each chain has 16 scan flip-flops. Assume that core1 has only 1 scan chain, and this chain also has 16 scan flip-flops. For simplicity of illustration, we assume that the speed of the bus clock is the same as the speed of the test clocks (capture and shift clocks) of the two embedded cores.

We illustrate scan testing of the two embedded cores by using the proposed embedded test protocol. Initially, Test Clients are in the Reset/Idle states. Test Server initiates a test session by sending a command packet to a Test Client. The command packet includes an escape sequence followed by a command to enable the Test Clients. Now, FSMs in both Test Clients are in the Test state. Test Server then sends a command packet that includes the escape sequence and a scan test command. This initiates scan test of the embedded cores. On receipt of the scan testing command, FSMs transition to the Scan state. Test Clients await further data from the Test Server.

Consider core0. It has two scan chains. Since the width of the SOC bus is 16 bits, a single bus word (16-bit data) translates into scan data for 8 consecutive scan shift clocks of the embedded core. Since core0 has 16 flip-flops per scan chain, we require two bus words to fully load the scan chains of core0 with a new set of test patterns. Therefore, the test packet that can fully load the scan chain of core0 consists of the following: a header that has one escape sequence and one test instruction to perform scan shift, and a payload with two data words. On the other hand, core1 has only one scan chain that has 16 scan flip-flops. Now, one bus word constitutes scan data for 16 consecutive scan shift clocks. Therefore, the test packet for core1 consists of: a header with an escape sequence that is followed by a test instruction to perform scan shift, and a payload with one data word. In general, if an embedded core has long scan chains, then packets with scan shift test instruction will contain a large payload.

Without any loss of generality, assume that the Test Server first sends a word of the test packet to core0. Test Client for core0 receives the data word and its FSM transitions to the Shift state. The FSM stays in this state for 8 scan clock cycles. While the test data is being scanned into the scan chains of core0, serial data that is scanned out of core0's is processed by the Test Client. In particular, this data is converted into a 16-bit data word that can be read by the Test Server. A Test Client raises a busy signal (see FIG. 4) to the Test Server while the corresponding core is undergoing scan shift. This is necessary because a Test Client cannot receive more data from the Test Server when scan chain(s) in the corresponding embedded core is (are) being scan shifted.

After sending a word to core0, Test Server sends a word to core1. Test Client of core1 receives the data word and its FSM transitions to the Shift state. The FSM stays in this state for 16 test cycles when the scan chain of core1 is being loaded with 16 bits.

After the scan chains of core0 are shifted by 8 bits, the FSM of the Test Client transitions to Scan Read state. The FSM stays in this state until the Test Server has read the 16-bit response data word that was previously constructed from the serial, scan-out data. The Test Server reads the response data word from core0, and the Test Client's FSM returns to the Scan state. In this state, the Test Client awaits the next data word from the Test Server. The Test Server sends the next data word (second data word of the test packet for core0). Test Client for core0 receives the data word, and uses 8 scan shift clock cycles to fully load the scan chains of core0 with a new test pattern.

Test Clients for core0 or core1 can receive capture instructions when their FSMs are in the Scan state. For example, the Test Server can send the following to the Test Client of core0: an escape sequence followed by a test instruction to proceed to the Wait state. The Test Client of core0 will remain in the Wait state until it receives capture instruction from the Test Server. The Test Server reads a data word from the Test Client for each of the cores, and sends an escape sequence to each of the Test Clients. When Test Clients receive an escape sequence, they wait for a test instruction by staying in the Wait state. The Test Server delivers test patterns to primary inputs of cores before starting a capture operation. Note that test patterns to primary inputs are delivered to core directly without intervention of the Test Client. When a Test Client receives a test instruction that contains a command to start a capture operation, the Test Client configures scan chain(s) in the embedded core to be in the capture mode. Test Client also clocks the scan flip-flops for a number of cycles that is specified in the test instruction to implement the multiple capture scheme. If more scan test data has to be delivered to an embedded core, then the Test Server repeats the scan shift operation.

F. Experiments and Results

We have implemented several experimental SOCs that include ITC99 benchmark circuits as embedded cores (all cores implement full-scan test methodology), embedded memory cores, and a commercial embedded processor core (Xtensa™ processor from Tensilica Inc.) or a custom test co-processor embedded core that we have developed. All SOCs have a 32-bit system bus that the embedded cores use to communicate with each other. For each embedded core in an SOC, we implemented a bus interface, based on Sonics, Inc.'s Open Core Protocol™ (OCP™)[Inc00a], that connects the core to the system bus. The OCP™ [Inc00a] is a functional superset of the VSIA's VCI [Gro00] specification. Test programs that use the proposed embedded core test protocol are written in C language. These programs were compiled to generate machine code for the Xtensa™ processor, by using the Xtensa™ Software Development Toolkit [Inc00b]. Test Clients for cores are written in Verilog and synthesized by using Synopsys Design Compiler™. We used NEC's 0.13 micron technology as the target library for the synthesis process. We also designed the Test Server as an embedded core. This core is also written in Verilog and was synthesized using the Synopsys Design Compiler and NEC's 0.13 micron technology library.

Test Client consists of three blocks (see Section IV.C). The design of the bus interface block is specific to the bus system that the SOC employs. Since all embedded cores including Test Clients connect to the same system bus, the bus interface blocks of all embedded cores are the same. The controller block of a Test Client is independent of the embedded core functionality or the SOC communication architecture. On the other hand, the design of the core interface block depends on the test structures incorporated in the embedded core. Embedded cores that have different number of scan chains require different core interface blocks. In particular, the serial to parallel converter in the core interface block has as many outputs as there are scan chains. Therefore, Test Clients that are used in our experiments differ only in the core interface blocks. Hardware area overhead for implementing the proposed embedded core test methodology is the area incurred by Test Clients.

Table 1 in FIG. 9 shows the characteristics of the embedded cores that were used in our experiments. All cores were synthesized using NEC 0.13 micron technology. For each embedded core, we report the grid count (# grids). One grid is defined as a 0.13 μm×0.13 μm square. We also report the full-scan structures in each core: number of flip-flops (# flip-flops), number of scan chains (# chains) and the number of flip-flops in the longest scan chain MSCL). For some embedded cores, we implemented several versions that only differed in the number of scan chains. For example, consider the embedded core b18. We designed two versions. One version had 16 scan chains and another version had 32 scan chains. The Test Client for the 16 scan chain version differs from the Test Client for the 32 scan chain version in only the design of the core interface block. The area (in number of grids) to implement the various Test Clients is also shown the table.

Please note that the Test Client designed to interface with a 16 scan chain embedded core, can be re-used for a different embedded core that also has 16 scan chains. This reusability reduces the test design effort significantly. The Table also shows the area required to implement a Test Server as an embedded test co-processor. SOCs that do not have a processor core, or in cases where the processor cycles cannot be spared for test purposes, a test co-processor can be included in the SOC.

For each embedded core, Table 1 in FIG. 9 also shows the number of bus clock cycles required to test the embedded core in isolation (i.e., under the assumption that the embedded core is the only core to be tested by the Test Server) for two different cases: case1 and case2. In case1, during scan shift operations, scan flip-flops in all embedded cores are shifted at the same speed as the bus clock speed and in case2, scan flip-flops are shifted at one-half speed of the bus clock speed. We assume that each core requires delivery and observation of responses for 256 test patterns. The numbers shown in parenthesis are the number of test cycles required if responses to test patterns are compressed by the Test Client (by using a MISR) and The Test Server reads a final signature.

We designed three different SOCs (SOC1, SOC2, and SOC3) using cores shown in Table 1. in FIG. 9 and Table 2 in FIG. 10 reports the area overhead due to the embedded core test protocol, and the test application time for several SOC designs. For each SOC, we list the constituent embedded cores (cores). SOC1 is consists of an Xtensa processor, b14, b17, b20, and 4 bus interfaces that connect each core to the 32-bit SOC bus. SOC2 consists of an Xtensa processor, and embedded cores b17 and b18 (with 32 scan chains), and 3 bus interfaces. SOC3 uses a test co-processor instead of an Xtensa processor. It also has cores b15, b18 (with 16 scan chains), b21, and b22.

For each embedded core, we list the area overhead due to the addition of the Test Client. This area overhead is also reported (in parenthesis) as a percentage of the total area of the embedded core. For example, consider the design SOC1. This design has several embedded cores: Xtensa processor core, b14, b17, b20, three Test Clients, and 4 bus interfaces. The embedded core b17 has 32 scan chains, and the corresponding Test Client required an area of 8397 grids. This area translates to 6.9% of the total area required to implement the embedded core b17. For each SOC, we also report the overall test overhead for the entire SOC, as a fraction of the SOC grid count. For example, for design SOC1, the area overhead for test support was 27,905 grids or about 3.96% of the total SOC area.

The column test application time reports the number of SOC bus clock cycles required to test each core. For each core, we specify the number of cycles required to test the core in isolation. Our test protocol overlaps testing of multiple embedded cores and we show the overall SOC-level test application time for each SOC design. For example, the design SOC1 required only 32,268 bus cycles to exercise all cores in the design. Compared to the case of testing each core, one at a time, our protocol cuts the test application time by 12.5%.

Experimental results show that area overhead of Test Clients is very low. Note that Area overhead of Test Clients in SOC2 is only 1.7%. If we consider grid count for the bus (this is not included in the grid count for the entire SOC shown in Table 2 in FIG. 10, the overhead for Test Clients will be even lower.

Since our protocol allows test application for embedded cores to be overlapped, overall test application time to test the SOC can be shorter than the sum of test application times of individual cores. This is because while a core is performing scan shift operation and is not ready to receive any test data from the Test Server, the Test Server can send test data to other cores in the SOC. In case1, the scan shift clock speed of all embedded cores is the same as the bus clock speed. Furthermore, the number of scan chains in all cores is the same as or one-half of the SOC bus width. Therefore, cores stay in scan shift operation for at most two consecutive bus cycles. Therefore, the reduction in overall test application time due to overlapped test application is not spectacular. For example, since b17 and b18 of SOC2 have 32 chains, these cores stay in scan shift operation for only one bus cycle. Hence, no reduction in test application time is achieved for SOC2. However, if the scan shift clock speed is significantly slower than the bus clock speed, cores need many bus cycles to scan in a test word delivered by the Test Server. This results in more opportunities for the Test Server to overlap testing of multiple cores. This leads to a significant reduction in overall test application time. Please note that in case2, the overall test application time for SOC3 is reduced by 51% and 30% of reduction is achieved even for SOC2.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A test system for a system on chip, wherein said system on chip has a:
    plurality of cores such that at least one of said plurality of cores is adapted to use a test protocol independent of a communication fabric used in the system on chip,
    wherein a test client is connected only to test inputs and test outputs of said at least one of said plurality of cores.

2. The test system of claim 1, wherein one of said plurality of cores is adapted to use multiple test schemes.

3. The test system of claim 1, wherein a first one of said plurality of cores and a second one of said plurality of cores are from different vendors.

4. The test system of claim 3, wherein the test system is adapted to use a uniform system on chip-level test strategy for said plurality of cores.

5. The test system of claim 1, wherein a first one of said plurality of cores is adapted to use a first test scheme and a second one of said plurality of cores is adapted to use a second test scheme different from said first test scheme.

6. The test system of claim 1, wherein no delay is added to paths in the system on chip.

7. The test system of claim 1, wherein test application time of a first one of said plurality of cores overlap a test application time of a second one of said plurality of cores.

8. A system-on-chip with an embedded test protocol architecture, said system on chip comprising:
    at least one embedded core;
    a communication fabric that connects said at least one embedded core;
    at least one test server; and
    at least one test client connected to said at least one embedded core and connected to the communication fabric;
    wherein said at least one test client is connected only to test inputs and test outputs of the at least one embedded core.

9. The system on chip of claim 8, wherein said at least one embedded core connects to the communication fabric using bus interface logic.

10. The system on chip of claim 9, wherein the bus interface logic connects only to inputs and outputs of said at least one embedded core.

11. The system on chip of claim 8, wherein said at least one test server is implemented as an embedded core.

12. The system on chip of claim 8, wherein said at least one test server is implemented on an on-chip processor core.

13. The system on chip of claim 8, wherein said at least one test client is connected only to test ports of the at least one embedded core.

14. The system on chip of claim 13, wherein said at least one test client delivers test data to the at least one embedded core by using the test ports.

15. The system on chip of claim 8, wherein the communication fabric is a bus.

16. The system on chip of claim 15 wherein the at least one test server operates as a sole bus master.

17. The system on chip of claim 8 wherein said at least one test server and said at least one test client are adapted to exchange information using a fixed-format packet.

18. The system on chip of claim 17, wherein the fixed-format packet is variable sized.

19. The system on chip of claim 17, wherein the system on chip is adapted to transmit the fixed-format packet using multiple bus transactions.

20. The system on chip of claim 17, wherein the fixed-format packet comprises a header and a payload.

21. The system on chip of claim 20, wherein the at least one test client treats all data received after a header as payload until the at least one test client receives another header.

22. A test client for use with a system-on-chip with an embedded test protocol, said test client comprising:
    a bus interface block that generates communication signals required to plug the test client into a communication fabric of the system on chip;
    a core interface block that converts test data into serial data streams; and
    a controller block that interprets received test packets,
    wherein said test client is connected only to test inputs and test outputs of an embedded core in the system-on-chip.

23. The test client of claim 22, wherein the core interface block converts responses from embedded cores of the system on chip into packets.

24. The test client of claim 23 wherein the controller block further comprises a decoder for interpreting received test packets and a finite state machine that provides necessary signals to control the core interface block and the bus interface block.

25. A test system for a circuit board, wherein said circuit board has a plurality of cores such that at least one of said plurality of cores is adapted to use a test protocol independent of a communication fabric used in the circuit board
    wherein a test client is connected only to test inputs and test outputs of said at least one of said plurality of cores.

26. The test system of claim 25, wherein one of said plurality of cores is adapted to use multiple test schemes.

27. The test system of claim 25, wherein the plurality of cores are from different vendors.

28. Test system of claim 25, wherein the system is adapted to use a uniform circuit board-level test strategy for said plurality of cores.

29. The test system of claim 25, wherein a first one of said plurality of cores is adapted to use a first test scheme and a second one of said plurality of cores is adapted to use a second test scheme different from said first test scheme.

30. The test system of claim 25, wherein no delay is added to paths in the test system on chip.

31. The test system of claim 25, wherein test application time of a first one of said plurality of cores overlap a test application time of a second one of said plurality of cores.

* * * * *